(12) United States Patent
Kim et al.

(10) Patent No.: US 10,635,285 B2
(45) Date of Patent: Apr. 28, 2020

(54) DEVICE AND METHOD FOR MOVING THE DISPLAY OF CARTOON DATA

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 66 days.

(21) Appl. No.: 15/661,922

(22) Filed: Jul. 27, 2017

(65) Prior Publication Data
US 2017/0336937 A1 Nov. 23, 2017

Related U.S. Application Data

(63) Continuation of application No. PCT/KR2015/012383, filed on Nov. 18, 2015.

(30) Foreign Application Priority Data

Jan. 28, 2015 (KR) .......................... 10-2015-0013543

(51) Int. Cl.
*G06F 9/48* (2006.01)
*G06F 3/0485* (2013.01)
(Continued)

(52) U.S. Cl.
CPC .......... *G06F 3/0485* (2013.01); *G06F 3/0483* (2013.01); *G06T 13/80* (2013.01);
(Continued)

(58) Field of Classification Search
CPC .. G06F 3/0485; G06F 3/0483; G06F 3/04883; G06F 2203/04803; G06T 13/80; G06Q 30/0277
See application file for complete search history.

(56) References Cited

U.S. PATENT DOCUMENTS

| 9,996,249 B2 * | 6/2018 | Park ...................... G06F 3/0488 |
| 2012/0192113 A1 * | 7/2012 | Higuchi .................. G06F 1/162 |
| | | 715/835 |
| 2013/0154978 A1 * | 6/2013 | Kim ...................... G06F 3/0483 |
| | | 345/173 |

FOREIGN PATENT DOCUMENTS

| JP | 2013-88837 A | 5/2013 |
| JP | 2013088837 A * | 5/2013 |

(Continued)

OTHER PUBLICATIONS

Int'l. Search Report issued in Int'l. App. No. PCT/KR2015/012383, dated Feb. 29, 2016.
(Continued)

*Primary Examiner* — Jennifer N To
*Assistant Examiner* — K C Chen
(74) *Attorney, Agent, or Firm* — Greer Burns & Crain Ltd.

(57) ABSTRACT

The present invention relates to a device and method for displaying cartoon data. The cartoon data display device includes a display unit configured to display a display region of cartoon data, a reception unit configured to receive a first user event signal or a second user signal from a user and a control unit configured to perform control to display a first layer on the display unit while moving the first layer in a first direction in response to the reception of the first user event signal and display a second layer on the display unit while
(Continued)

moving the second layer in a second direction in response to the reception of the second user event signal.

15 Claims, 7 Drawing Sheets

(51) Int. Cl.
  *G06T 13/80*  (2011.01)
  *G06F 3/0483*  (2013.01)
  *G06F 3/0488*  (2013.01)
  *G06Q 30/02*  (2012.01)

(52) U.S. Cl.
  CPC .................. *G06F 3/04883* (2013.01); *G06F 2203/04803* (2013.01); *G06Q 30/0277* (2013.01)

(56) References Cited

FOREIGN PATENT DOCUMENTS

| KR | 2001-0107441 A | 12/2001 |
| KR | 10-2010-0011336 A | 2/2010 |
| KR | 10-2013-0050606 A | 5/2013 |
| KR | 10-2013-0070090 A | 6/2013 |
| KR | 10-2014-0082606 A | 7/2014 |

OTHER PUBLICATIONS

Japanese Office Action from Japanese Patent Application No. 2017-539271.

Gootara.org. (Dec. 16, 2033). [E-Book Comics] I want this app to do this (part 1)[Blog post]. Retrieved from http://gootara.org/library/2013/12/post-1.html.

\* cited by examiner

DEVICE AND METHOD FOR MOVING THE DISPLAY OF CARTOON DATA

CROSS-REFERENCE TO RELATED APPLICATIONS

This is a continuation application of International Application No. PCT/KR2015/012383, filed Nov. 18, 2015, which claims benefit of Korean Patent Application No. 10-2015-0013543, filed Jan. 28, 2015.

BACKGROUND OF THE INVENTION

Field of Invention

The present invention relates to a device and method for displaying cartoon data.

Description of Related Art

A cartoon is a picture intended to satirize or criticize life or society by exaggerating or omitting the features of an object using humor, caricature, satire, etc. Cartoons are classified into various fields, e.g., a romance cartoon, a martial arts cartoon, an action cartoon, a comic cartoon, a sports cartoon, a science fiction (SF) cartoon, etc., according to the contents thereof. A cartoon may show human complex attitudes using a visual system of pictures (images) and characters (text) and is thus more effective to draw the attention of readers than a general book only containing characters.

Recently, with the advancement in communication technology, cartoons have been provided not only through cartoon books but also via the Internet or the like.

The foregoing background is technical information the inventors possessed for or obtained in the course of the present invention, and thus may not be publicly known before the filing of this application.

The present invention is designed to address the foregoing problems and/or limitations, and one objective of the present invention is to arouse interest in cartoon data of a user who is viewing the cartoon data by, when the cartoon data is moved in a second direction while the cartoon data is viewed in a first direction, ending display of a cartoon data cut of a first story and providing cartoon data of a second story.

Also, one objective is to arouse interest in cartoon data of a user who is viewing the cartoon data by, when the cartoon data is moved in a second direction while the cartoon data is viewed in a first direction, ending display of a cartoon data cut of a first story and providing advertisement information regarding an object included in the cartoon data cut of the first story.

Also, one objective is to arouse interest in cartoon data of a user who is viewing the cartoon data by, when the cartoon data is moved in a second direction while the cartoon data is viewed in a first direction, ending display of a cartoon data cut of a first story and providing guidance information for inducing reading of cartoon data of the first story to be repeated at least once.

BRIEF SUMMARY OF THE INVENTION

A cartoon data display device according to an embodiment of the present invention may include a display unit configured to display a display region of cartoon data; a reception unit configured to receive a first user event signal or a second user event signal from a user; and a control unit configured to perform control to display a first layer on the display unit while moving the first layer in a first direction in response to the reception of the first user event signal, and display a second layer on the display unit while moving the second layer in a second direction in response to the reception of the second user event signal.

The reception unit may receive one of a scroll input, a direction key input, and a moving touch input from the user.

The second layer may include advertisement information regarding an object included in the first layer.

The second layer may include guidance information for inducing reading of the cartoon data to be repeated at least once.

The control unit may perform control to overlay and display the first layer and the second layer when the second user event signal is received.

The control unit may perform control to end the display of the first layer and display the second layer when the second user event signal is received.

The control unit may perform control to display the second layer on the display unit while moving the second layer in the second direction in response to the reception of the second user event signal only after the last cut of the first layer is displayed on the display unit.

The control unit may perform control to display the second layer on the display unit while moving the second layer in the second direction in response to the reception of the second user event signal after at least a predetermined threshold of the first layer is displayed on the display unit.

The control unit may perform control to display the second layer on the display unit in response to the reception of either the first user event signal or the second user event signal after the last cut of the first layer is displayed on the display unit.

A cartoon data display method according to an embodiment of the present invention may include displaying, by a display unit, a display region of cartoon data; receiving, by a reception unit, a first user event signal or a second user event signal from a user; and performing, by a control unit, control to display a first layer on the display unit while moving the first layer in a first direction in response to the reception of the first user event signal, and display a second layer on the display unit while moving the second layer in a second direction in response to the reception of the second user event signal.

The receiving may include receiving one of a scroll input, a direction key input, and a moving touch input from the user.

The second layer may include advertisement information regarding an object included in the first layer.

The second layer may include guidance information for inducing reading of the cartoon data to be repeated at least once.

The controlling may include performing control to overlay and display the first layer and the second layer when the second user event signal is received.

The controlling may include performing control to end the display of the first layer and display the second layer when the second user event signal is received.

The controlling may include performing control to display the second layer on the display unit while moving the second layer in the second direction in response to the reception of the second user event signal only after the last cut of the first layer is displayed on the display unit.

The controlling may include performing control to display the second layer on the display unit while moving the second layer in the second direction in response to the reception of the second user event signal after at least a predetermined threshold of the first layer is displayed on the display unit.

The controlling may include performing control to display the second layer on the display unit in response to the reception of either the first user event signal or the second user event signal after the last cut of the first layer is displayed on the display unit.

In addition, other methods and systems for implementing the present invention and a computer-readable recording medium having a computer program recorded thereon to execute the methods may be further provided.

The above and other aspects, features, and advantages of the present invention will become apparent from the following description taken in conjunction with the accompanying drawings, claims, and detailed description.

According to embodiments, it is possible to arouse interest in cartoon data of a user who is viewing the cartoon data by, when the cartoon data is moved in a second direction while the cartoon data is viewed in a first direction, ending display of a cartoon data cut of a first story and providing cartoon data of a second story.

It is also possible to arouse interest in cartoon data of a user who is viewing the cartoon data by, when the cartoon data is moved in a second direction while the cartoon data is viewed in a first direction, ending display of a cartoon data cut of a first story and providing advertisement information regarding an object included in the cartoon data cut of the first story.

It is also possible to arouse interest in cartoon data of a user who is viewing the cartoon data by, when the cartoon data is moved in a second direction while the cartoon data is viewed in a first direction, ending display of a cartoon data cut of a first story and providing guidance information for inducing reading of cartoon data of the first story to be repeated at least once.

DETAILED DESCRIPTION OF THE INVENTION

Figure 1:
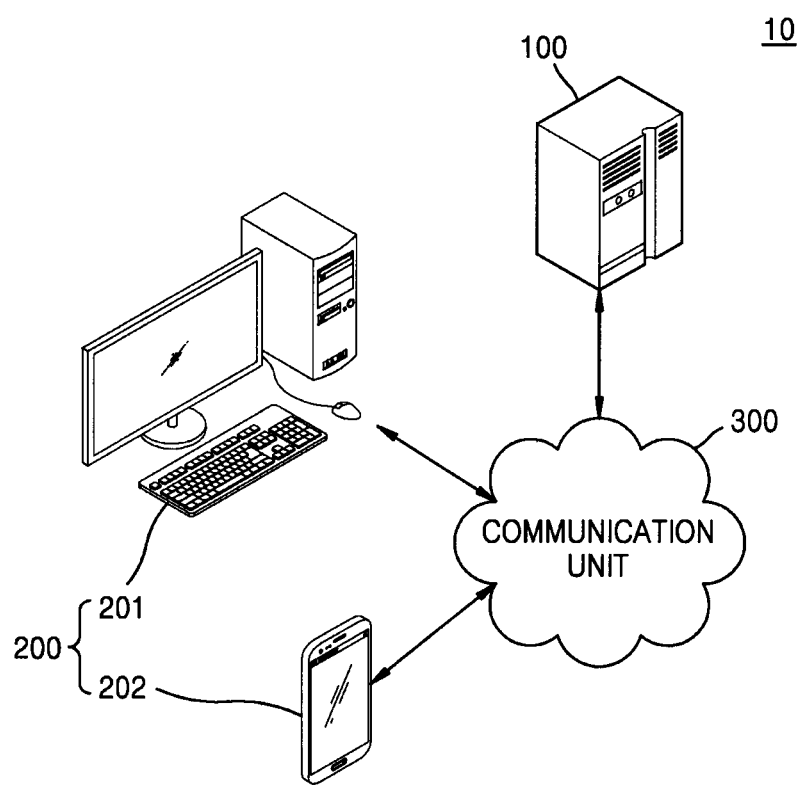
FIG. 1 is a diagram showing a cartoon data display system according to an embodiment of the present invention.

Advantages and features of the present invention and implementation methods thereof will be clarified through following embodiments described with reference to the accompanying drawings. However, the present invention is not limited to the following embodiments and may be embodied in different ways. Additionally, it should be understood that the present invention covers all modifications, equivalents, and alternatives falling within the spirit and scope of the invention. The following embodiments are provided so that this disclosure will be thorough and complete and will fully convey the concept of the present invention to those skilled in the art. In the description of embodiments, certain detailed explanations of a related art are omitted when it is deemed that they may unnecessarily obscure the essence of the invention.

The terminology used herein is for the purpose of describing particular embodiments only and is not intended to limit the invention. As used herein, the singular forms "a," "an," and "the" are intended to include the plural forms as well, unless the context clearly indicates otherwise. The terms "comprises," "comprising," "includes," "including," and/or "having," when used herein, should be understood as specifying the presence of stated features, integers, steps, operations, elements, components, and/or groups thereof while not precluding the presence or addition of one or more other features, integers, steps, operations, elements, components, and/or groups thereof. Relational terms such as first, second, and the like may be used for describing various elements, but the elements are not limited by the terms. These terms are only used to distinguish one element from another.

In the present disclosure, the term 'cartoon data' means data created by a cartoonist and may include the amount of cartoon data to be provided as one episode. A piece of the cartoon data may include at least one cut. Here, the term 'cut' means data containing one scene, and may include at least one layer including an image or text. In cartoon data, each of cuts may be individually included in the form of an image file. Also, a display region may include a region where all or part of the cartoon data is displayed to a user through a display unit.

Hereinafter, embodiments of the present invention will be described in detail with reference to the accompanying drawings, and the same or similar elements will be designated with the same numeral references regardless of the numerals in the drawings, and redundant descriptions thereof will be omitted.

FIG. 1 is a diagram showing a cartoon data display system 10 according to an embodiment of the present invention. Referring to FIG. 1, the cartoon data display system 10 according to an embodiment of the present invention includes a cartoon data server 100, a cartoon data display device 200, and a communication network 300.

The cartoon data server 100 provides cartoon data or a cartoon data display tool to a user terminal. The cartoon data server 100 may provide the cartoon data on an artist basis, a work basis, an installment basis, and a day-of-the-week basis and also may provide work whose serialization has ended. The cartoon data server 100 may selectively provide the cartoon data according to a request from the cartoon data display device 200. The cartoon data server 100 may provide the cartoon data to the cartoon data display device 200 over the communication network 300 in the form of an application.

The cartoon data display device 200 may display cartoon data stored therein or cartoon data received from the cartoon data server 100 to correspond to a user event. The cartoon data display device 200 may display first to last cuts on a single page or may separately display the cuts on a plurality of pages. The cartoon data display device 200 may display the cartoon data while changing a display region displayed through a display unit of the cartoon data display device 200 by moving the cartoon data in accordance with the user event.

Each of a plurality of cartoon data display devices 200 may refer to a communication terminal that may use a web service in a wired or wireless communication environment. Here, the cartoon data display device 200 may be a personal computer 201 or a portable terminal 202 of a user. In FIG. 1, the portable terminal 202 is shown as a smartphone, but the spirit of the present invention is not limited thereto. As described above, a terminal equipped with a web browsing application may be used without limitation.

In more detail, the cartoon data display device 200 may include a computer (e.g., a desktop, a laptop, a tablet, etc.), a media computing platform (e.g., a cable set-top box, a satellite set-top box, and a digital video recorder), a handheld computing device (e.g., a personal digital assistant (PDA), an email client, etc.), any type of cell phone, or any type of computing or communication platform, but the present invention is not limited thereto.

The communication network 300 may serve to connect the plurality of cartoon data display devices 200 with the cartoon data server 100. That is, the communication network 300 refers to a communication network that provides a connection path through which the cartoon data display devices 200 may connect to the cartoon data server 100 and then transmit or receive data. For example, the communication network 300 may cover wired networks such as local area networks (LANs), wide area networks (WANs), metropolitan area networks (MANs), and integrated services digital networks (ISDNs) or wireless networks such as wireless LANs (WLANs), CDMA, Bluetooth, and satellite communication, but the scope of the present invention is not limited thereto. The communication network 300 may be a device including hardware and software needed to transmit and receive signals such as a control signal or a data signal through wired/wireless connection with another network device.

Figure 2:
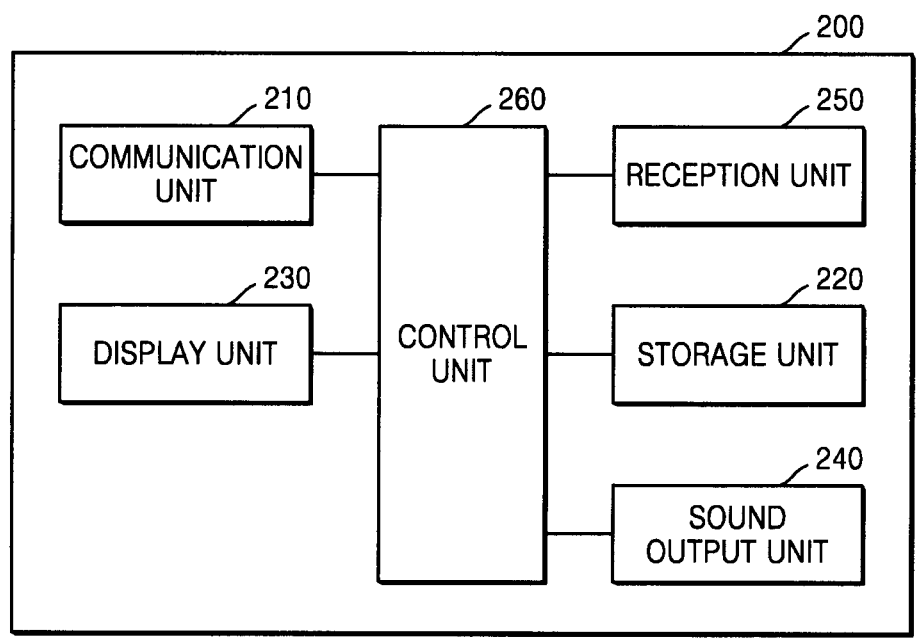
FIG. 2 is a block diagram showing a cartoon data display device according to an embodiment of the present invention.

FIG. 2 is block diagram showing the cartoon data display device 200 according to an embodiment of the present invention. Referring to FIG. 2, the cartoon data display device 200 includes a communication unit 210, a storage unit 220, a display unit 230, a sound output unit 240, a reception unit 250, and a control unit 260.

The communication unit 210 may include one or more elements for communicating with the cartoon data display device 200 and the cartoon data server 100. For example, the communication unit 210 may include a short-range wireless communication unit and a mobile communication unit. The short-range wireless communication unit may include, but is not limited to, a Bluetooth communication unit, a Bluetooth low energy (BLE) communication unit, a near field communication unit, a WLAN (e.g., Wi-Fi) communication unit, a ZigBee communication unit, an Infrared Data Association (IrDA) communication unit, a Wi-Fi Direct (WFD) communication unit, an ultra wideband (UWB) communication unit, and an Ant+ communication unit. The mobile communication unit may transmit and receive wireless signals to and from at least one of a base station, an external terminal, and a server over a mobile communication network. Here, the wireless signals may include voice call signals, video call signals, or various types of data according to transmission and/or reception of text and/or multimedia messages. The communication unit 210 may acquire cartoon data in communication with the cartoon data server 100 and may also acquire an application for displaying cartoon data from the cartoon data server 100.

The storage unit 220 may store the cartoon data acquired through the communication unit 210. Also, the storage unit 220 may store audio data including sound signals related to a sound effect and background sound that are acquired in association with the cartoon data. The storage unit 220 may function to temporarily or permanently store cartoon data processed by the control unit 260. Here, the storage unit 220 may include magnetic storage media or flash storage media, but the scope of the present invention is not limited thereto.

The display unit 230 may display the cartoon data, and also may display the cartoon data while moving the cartoon data in accordance with a user event for the cartoon data. When the display unit 230 is configured as a touchscreen by forming a layered structure along with a touchpad, the display unit 230 may be used as an input device as well as an output device. The display unit 230 may include at least one of a liquid crystal display (LCD), a thin film transistor-LCD (TFT-LCD), an organic light emitting diode (OLED) display, a flexible display, a three-dimensional (3D) display, and an electrophoretic display.

The sound output unit 240 outputs audio data received from the communication unit or stored in the storage unit 220. Also, the sound output unit 240 outputs sound signals related to a sound effect and background sound. The sound output unit 240 may include a speaker, a buzzer, etc.

Also, the sound output unit 240 may further include a vibration motor (not shown). The vibration motor may output vibration signals. For example, the vibration motor may output a vibration signal corresponding to an output of audio data or image data (e.g., a sound effect or background sound included in the cartoon data). Also, the vibration motor may output a vibration signal when the touch screen is touched.

The reception unit 250 denotes a means for receiving data used by a user to control a cartoon data display device. For example, the reception unit 250 may include, but is not limited to, a key pad, a dome switch, a touchpad (a contact capacitance type, a pressure resistance type, an infrared sensing type, a surface ultrasonic wave conduction type, an integral tension measurement type, a piezoelectric effect type, etc.), a jog wheel, a jog switch, etc.

The reception unit 250 may receive a user input. For example, the reception unit 250 may receive a first user event signal or a second user event signal from a user.

Here, the first user event signal may include a scroll input, a direction key input, and a moving touch input in a first direction for the cartoon data. Here, the first direction may include a forward direction in which the scenes or cuts of the cartoon data are sequentially moved from the beginning to the end on the display unit 230, for example, a direction upward from any point on the display unit 230.

Also, the second user event signal may include a scroll input, a direction key input, and a moving touch input in a second direction for the cartoon data. Here, the second direction may include a backward direction in which the scenes or cuts of the cartoon data are moved backward in the opposite direction to the forward direction on the display unit 230, for example, a direction downward from any point on the display unit 230.

The control unit 260 may perform control such that the cartoon data is displayed through the display unit 230. The control unit 260 may include any type of device capable of processing data, such as a processor configured to control the overall operation of the cartoon data display device 200. Here, for example, the processor may refer to a hardware built-in data processing device having a circuit physically structured to perform a function expressed in a code or instructions included in a program. For example, the hardware built-in data processing device may include a microprocessor, a central processing unit (CPU), a processor core, a multiprocessor, an application-specific integrated circuit (ASIC), a field programmable gate array (FPGA), etc., but the scope of the present invention is not limited thereto.

The control unit 260 may perform control to display a first layer on the display unit 230 while moving the first layer in the first direction (e.g., the forward direction) in response to the reception of the first user event signal and to display a second layer on the display unit 230 while moving the second layer in the second direction (e.g., the backward direction) in response to the reception of the second user event signal.

Here, the first layer may include a main cut of the cartoon data, and the second layer may be an additional layer, which is a sub cut, provided on the same main cut, and may be stored in addition to the first layer. The second layer need not be displayed when the second user event signal is not received, and may be displayed when the second user event signal is received.

Also, the second layer may include a different image or text, and the second layer may create a modified story or a new story in comparison to the first layer, which is the main cut. Accordingly, when the first layer is cartoon data having a first story, the second layer may be cartoon data having a second story.

Also, the second layer may include advertisement information regarding an object in the first story contained in the first layer, which is the main cut. The advertisement information may include advertisement information regarding an object displayed on the display unit 230, for example, drinks, instant noodles, home appliances, etc.

Also, the second layer may include guidance information for inducing reading of the cartoon data composed of the first layer to be repeated at least once. The guidance information may, for example, include a foreshadowing item that offers a clue to an accident case occurring in the first story contained in the first layer or predicts an accident case that will occur in a first story configured as a first layer in the next episode or a new item (e.g., a fear item that expresses a ghost) added to the first story configured as the first layer.

In this embodiment, the second layer has been described as the advertisement information or the guidance information. However, the present invention is not limited thereto, and thus the second layer may be implemented as various images and/or text depending on an artist's intent, i.e., the intent of the creator of the cartoon content.

As an alternative embodiment, the control unit 260 may display the first layer on the display unit 230 while moving the first layer in the first direction in response to the reception of the first user event signal, and may end the display of the first layer on the display unit 230 and display and move the second layer in the second direction in response to the reception of the second user event signal.

As an alternative embodiment, the control unit 260 may perform control to display the first layer on the display unit 230 while moving the first layer in the first direction (e.g., the forward direction) in response to the reception of the first user event signal and to overlay and display the second layer on the first layer while moving the first layer and the second layer in the second direction (e.g., the backward direction). Here, the second layer may be a layer in which only advertisement information or guidance information to be added to the first layer is displayed, and one complete cut of the cartoon data may be represented by overlaying the second layer and the first layer.

In the foregoing description, the control unit 260 separately displays the first layer and the second layer on the display unit 230. However, this embodiment may have a difference in that the control unit 260 displays a result of overlaying the first layer and the second layer on the display unit 230.

As an alternative embodiment, only after displaying the last cut of the first layer on the display unit 230, the control unit 260 may perform control to display the second layer of the cartoon data on the display unit 230 while moving the second layer in the second direction in response to the reception of the second user event signal.

As an alternative embodiment, after displaying up to a predetermined threshold number of cuts of the first layer on the display unit 230, the control unit 260 may perform control to display the second layer on the display unit 230 while moving the second layer in the second direction in response to the reception of the second user event signal.

As an alternative embodiment, after displaying the last cut of the first layer on the display unit 230, the control unit 260 may perform control to display the second layer on the display unit 230 in response to the reception of either the first user event signal or the second user event signal.

Figure 3:
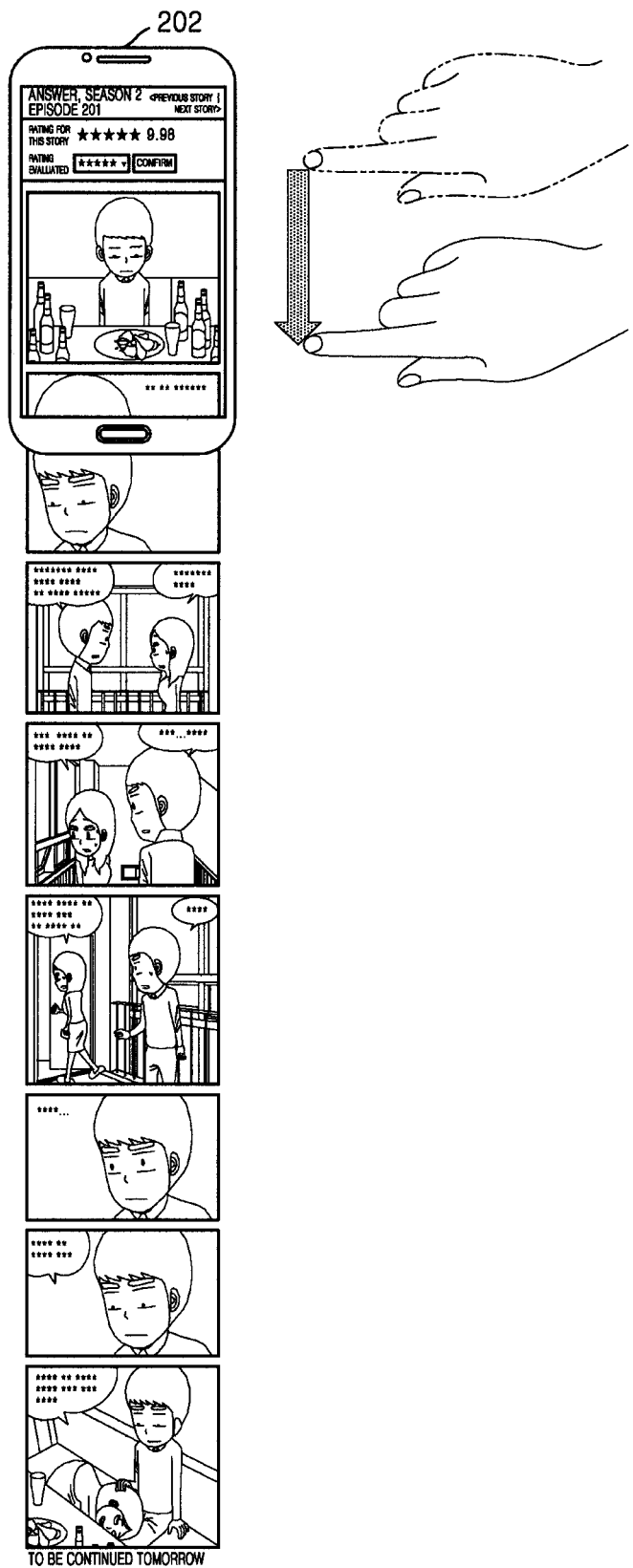
FIGS. 3 to 6 are example diagrams showing screens displayed by a cartoon data display device according to an embodiment of the present invention.

FIG. 3 is an example screen displayed by the cartoon data display device 200, which is the portable terminal 202, according to an embodiment of the present invention. Referring to FIG. 3, cartoon data is shown on the portable terminal 202. For example, all cartoon data offered at any date is shown among daily serialized cartoon data.

The portable terminal 202 may display the first layer having the first story in the first direction (e.g., the forward direction) in response to the reception of the first user event signal. Here, the first layer may include one or more cartoon data cuts. Also, whenever the first user event is received, the first layer may be moved by a certain distance in the first direction (e.g., the forward direction), and a corresponding cut among all cuts of the first layer may be displayed on the portable terminal 202. When the first user event signal is received multiple times, the last cut of the first layer may be displayed on the portable terminal 202.

Figure 4:
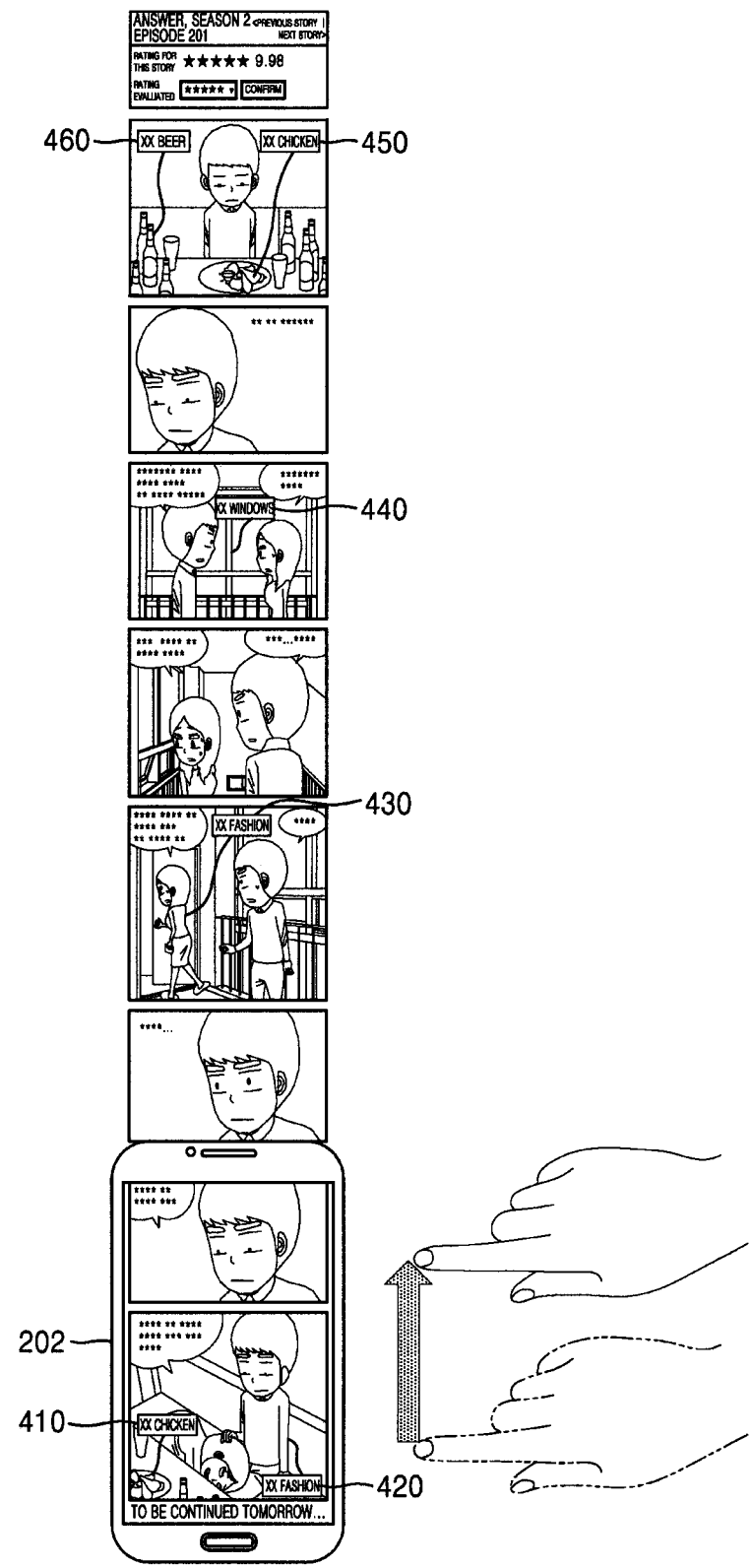

FIG. 4 is an example screen displayed by the cartoon data display device 200, which is the portable terminal 202, according to another embodiment of the present invention. Referring to FIG. 4, the last cut of the first layer is being displayed on the portable terminal 202 because the first user event signal was received multiple times. At this point, when the second user event signal is received, a second layer having a second story, for example, pieces of advertisement information 410 to 460 may be displayed on the portable terminal 202 in the second direction (e.g., the backward direction).

Here, whenever the second user event signal is received, the second layer may be moved by a certain distance in the second direction (e.g., the backward direction), and corresponding cuts including the pieces of advertisement information 410 to 460 among all cuts of the second layer may be displayed on the portable terminal 202. When the second user event signal is received multiple times, the first cut of the second layer may be displayed on the portable terminal 202.

Also, when the last cut of the first layer is not yet displayed on the portable terminal 202 but the second user event signal is received, the cuts of the second layer including the pieces of advertisement information 410 to 460 may be displayed with respect to cuts of the first layer that were displayed before the second user event signal was received. That is, a predetermined threshold number of cuts may be set, and a user may read the cuts of the first layer over the predetermined threshold. In this case, when the second user event signal is received although the last cut of the first layer is not yet displayed on the portable terminal 202, the cuts of the second layer including the pieces of advertisement information 410 to 460 may be displayed with respect to cuts of the first layer that were displayed before the second user event signal was received.

Also, after the last cut of the first layer is displayed on the portable terminal 202, the cuts of the second layer including the pieces of advertisement information 410 to 460 may be displayed when either the first user event signal or the second user event signal is received.

Figure 5:
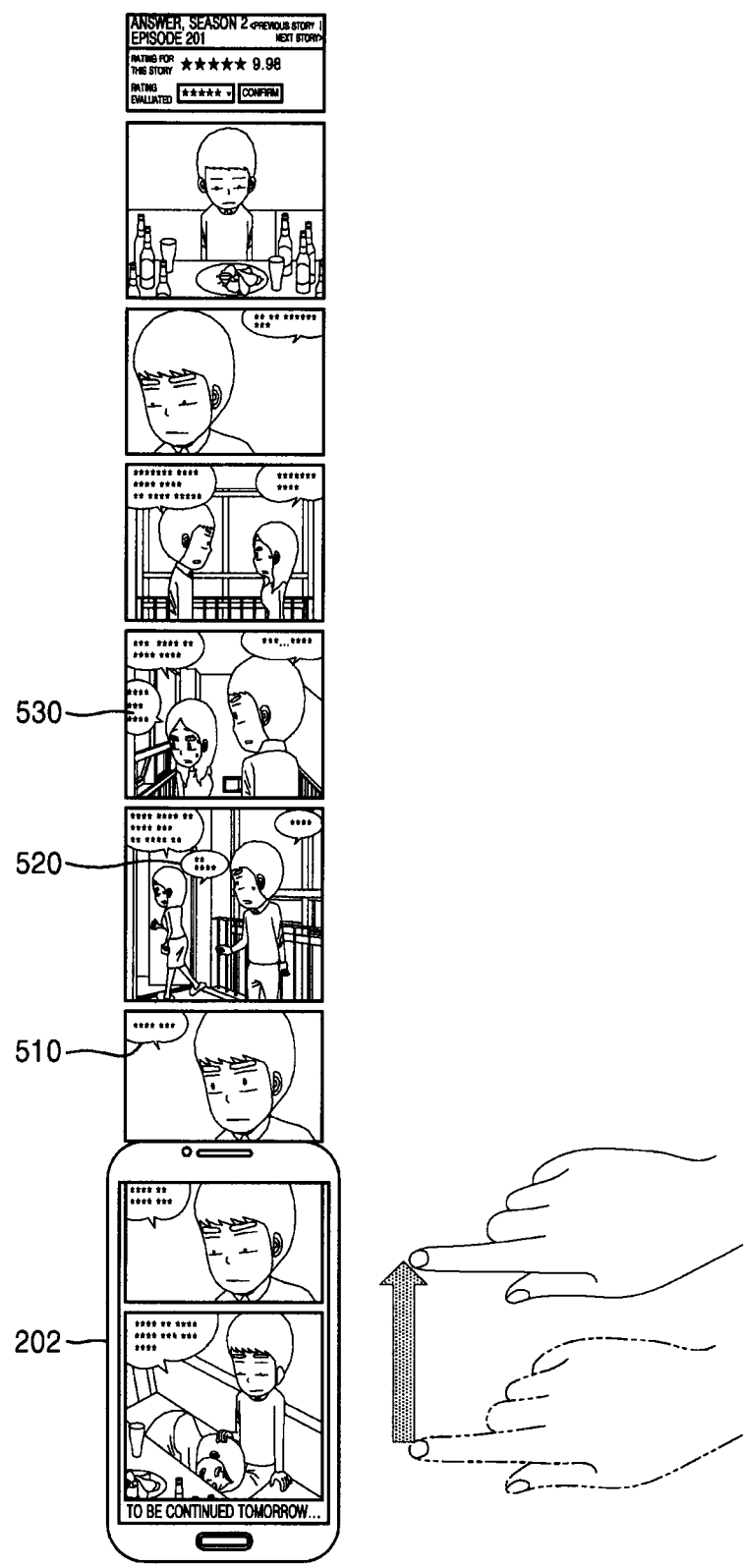

FIG. 5 is an example screen displayed by the cartoon data display device 200, which is the portable terminal 202, according to still another embodiment of the present invention. Referring to FIG. 5, the last cut of the first layer is being displayed on the portable terminal 202 because the first user event signal was received multiple times. At this point, when the second user event signal is received, a second layer having a second story, for example, foreshadowing items 510 to 530 of guidance information may be displayed on the portable terminal 202 in the second direction (e.g., the backward direction).

Here, whenever the second user event signal is received, the second layer may be moved by a certain distance in the second direction (e.g., the backward direction), and corresponding cuts including the foreshadowing items 510 to 530 of the guidance information among all cuts of the second layer may be displayed on the portable terminal 202. When the second user event signal is received multiple times, the first cut of the second layer may be displayed on the portable terminal 202.

Also, when the last cut of the first layer is not yet displayed on the portable terminal 202 but the second user event signal is received, the cuts of the second layer, for example, the foreshadowing items 510 to 530 of the guidance information may be displayed with respect to the cuts of the first layer that were displayed before the second user event signal was received. That is, a predetermined threshold number of cuts may be set, and a user may read the cuts of the first layer over the predetermined threshold. In this case, when the second user event signal is received although the last cut of the first layer is not yet read, the cuts of the second layer including the foreshadowing items 510 to 530 of the guidance information may be displayed with respect to the cuts of the first layer that were displayed before the second user event signal was received.

Also, after the last cut of the first layer is displayed on the portable terminal 202, the cuts of the second layer including the foreshadowing items 510 to 530 of the guidance information may be displayed when either the first user event signal or the second user event signal is received.

Figure 6:
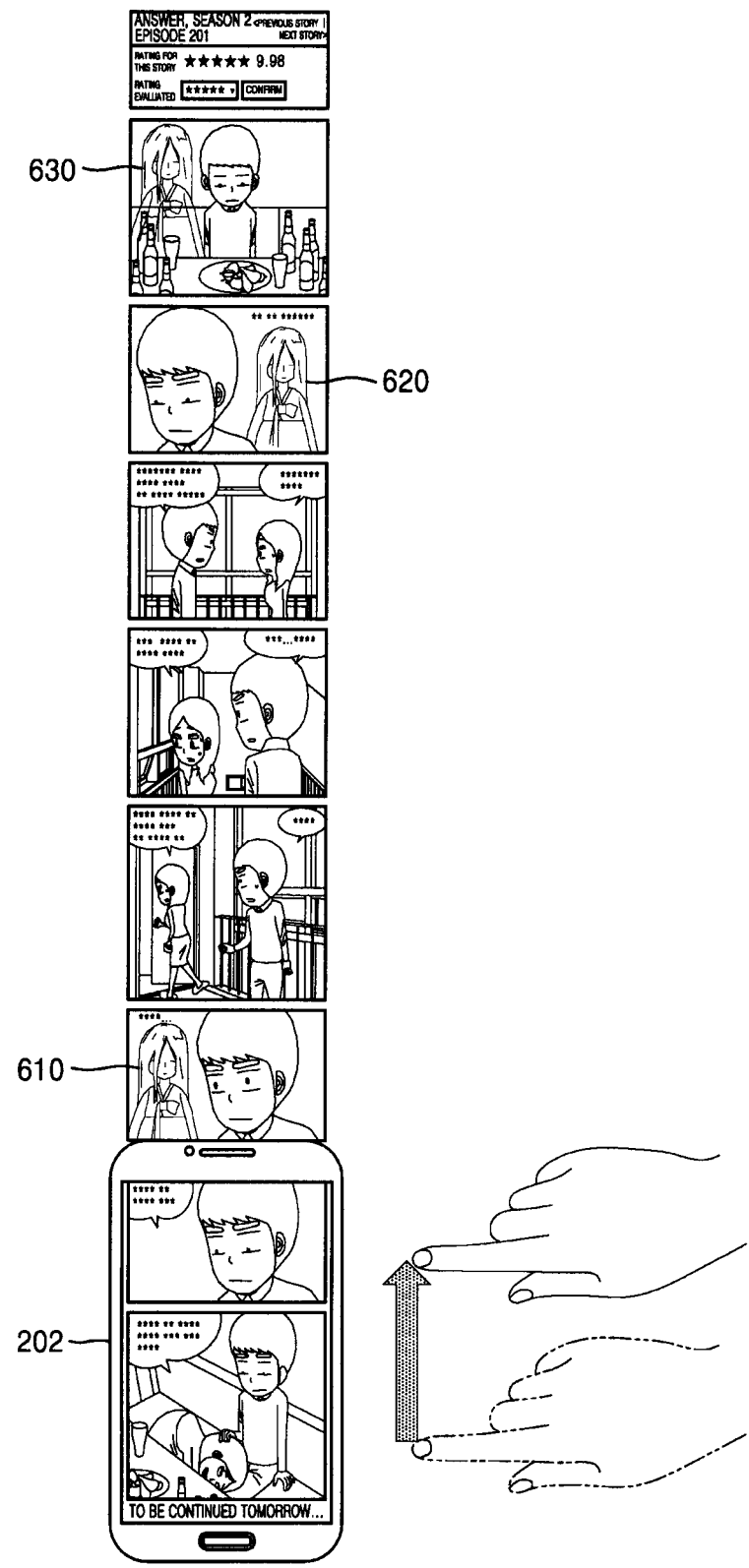

FIG. 6 is an example screen displayed by the cartoon data display device 200, which is the portable terminal 202, according to still another embodiment of the present invention. Referring to FIG. 6, the last cut of the first layer is being displayed on the portable terminal 202 because the first user event signal was received multiple times. At this point, when the second user event signal is received, a second layer having a second story, for example, fear items 610 to 630 of the guidance information may be displayed on the portable terminal 202 in the second direction (e.g., the backward direction).

Here, whenever the second user event signal is received, the second layer may be moved by a certain distance in the second direction (e.g., the backward direction), and corresponding cuts including the fear items 610 to 630 of the guidance information among all cuts of the second layer may be displayed on the portable terminal 202. When the second user event signal is received multiple times, the first cut of the second layer may be displayed on the portable terminal 202.

Also, when the last cut of the first layer is not displayed on the portable terminal 202 but the second user event signal is received, the cuts of the second layer including the fear items 610 to 630 of the guidance information may be displayed with respect to cuts of the first layer that were displayed before the second user event signal was received. That is, a predetermined threshold number of cuts may be set, and a user may read the cuts of the first layer over the predetermined threshold. In this case, when the second user event signal is received although the last cut of the first layer is not yet read, the cuts of the second layer including the fear items 610 to 630 of the guidance information may be displayed with respect to cuts of the first layer that were displayed before the second user event signal was received.

Also, after the last cut of the first layer is displayed on the portable terminal 202, the cuts of the second layer including the fear items 610 to 630 of the guidance information may be displayed when either the first user event signal or the second user event signal is received.

Figure 7:
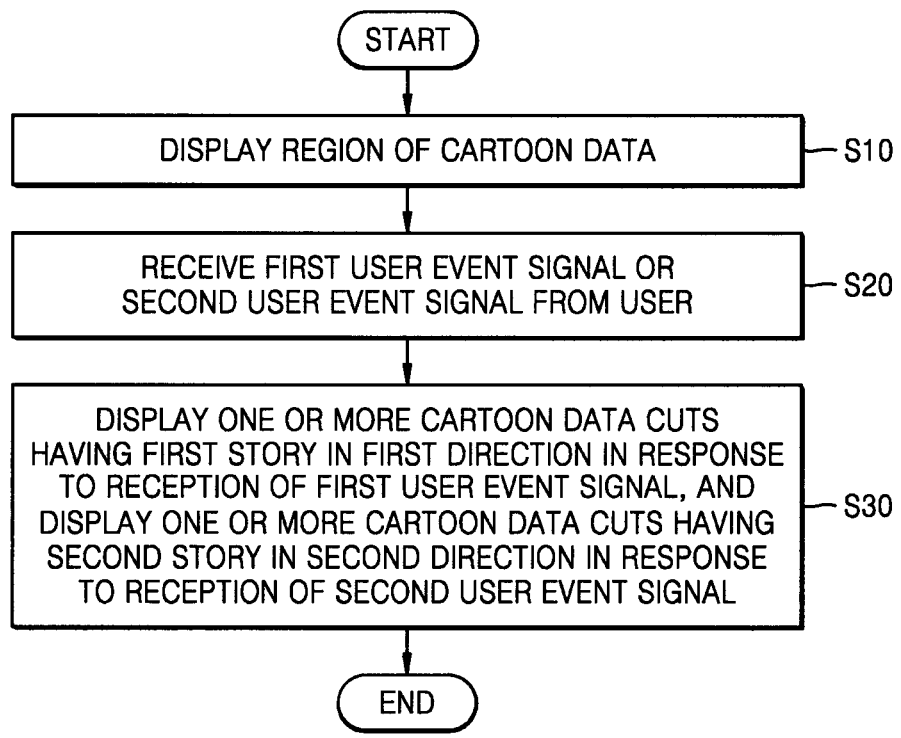
FIG. 7 is a flowchart illustrating a method of displaying cartoon data according to an embodiment of the present invention.

FIG. 7 is a flowchart illustrating a method of displaying cartoon data according to an embodiment of the present invention. Referring to FIG. 7, the cartoon data display device 200 displays cartoon data (S10).

The cartoon data display device 200 receives a first user event signal or a second user event signal from a user (S20). Here, the first user event signal may include a scroll input, a direction key input, and a moving touch input in a first direction for the cartoon data. Here, the first direction may include a forward direction in which the cartoon data is sequentially moved. Also, the second user event signal may include a scroll input, a direction key input, and a moving touch input in a second direction for the cartoon data. Here, the second direction may include a backward direction in which the cartoon data is moved backward.

The cartoon data display device 200 may display a first layer while moving the first layer in the first direction in response to the reception of the first user event signal, and may display a second layer while moving the second layer in the second direction in response to the reception of the second user event signal (S30). Here, the first layer may include a main cut of the cartoon data, and the second layer may be an additional layer, which is a sub cut, and may be stored in addition to the first layer. The second layer need not be displayed when the second user event signal is not received, and may be displayed when the second user event signal is received. Also, the second layer may include advertisement information regarding an object in the first story contained in the first layer, or guidance information for inducing reading of the cartoon data composed of the first layer to be repeated at least once.

As an alternative embodiment, the cartoon data display device 200 may display the first layer while moving the first layer in the first direction in response to the reception of the first user event signal, and may end the display of the first layer and display and move the second layer in the second direction in response to the reception of the second user event signal.

As an alternative embodiment, the cartoon data display device 200 may display the first layer while moving the first layer in the first direction in response to the reception of the first user event signal, and may overlap and display the first layer and the second layer on the display unit 230 while moving the first layer and the second layer in the second direction.

As an alternative embodiment, the cartoon data display device 200 may display the second layer while moving the second layer in the second direction in response to the reception of the second user event signal only after the last cut of the first layer is displayed. As an alternative embodiment, the cartoon data display device 200 may display the second layer while moving the second layer in the second direction in response to the reception of the second user event signal after at least a predetermined threshold of the first layer is displayed on the display unit 230. As an alternative embodiment, the cartoon data display device 200 may display the second layer in response to the reception of either the first user event signal or the second user event signal after the last cut of the first layer is displayed.

The above-described embodiments of the present invention may be implemented in the form of a computer program or program instruction that is executable through various computer components and recordable on a computer-readable recording medium. Examples of the computer-readable recording medium may include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as a ROM, a random access memory (RAM), or a flash memory that is specially designed to store and execute program instructions. The computer program or program instruction may be implemented in the form of software or an application and may be transmitted and distributed over the network.

The computer program may be designed and configured specially for the invention or may be known and available to those skilled in computer software. Examples of the computer program include a high-level language code executable by a computer with an interpreter in addition to a machine language code made by a compiler.

Any recitation of ranges of values herein is merely intended to serve as a shorthand method of referring individually to each separate value falling within the range unless otherwise indicated herein, and each separate value is incorporated into the specification as if it were individually recited herein.

Also, the steps of the methods described herein can be performed in any suitable order unless otherwise indicated herein or otherwise clearly contradicted by context. The present invention is not limited to the described order of the steps. The use of all examples or exemplary terms (e.g., "etc.," "such as," and "and (or) the like") is merely intended to describe the present invention in detail, and the scope is not necessarily limited by the examples or exemplary terms unless so defined by the claims. Also, one of ordinary skill in the art should appreciate that the present disclosure may be configured through various modifications, combinations, and changes according to design conditions and factors without departing from the scope of the claims and their legal equivalents.

Therefore, the spirit of the present invention is not to be limited by the aforementioned embodiments, and all changes within the claims and their legal equivalents should be construed as being included in the spirit of the present invention.

Embodiments of the present invention relate to a device and method for displaying cartoon data, and may be applicable to a cartoon data display device and method that arouse interest in cartoon data of a user who is viewing the cartoon data by ending display of a cartoon data cut of a first story when the cartoon data is moved in a second direction while the cartoon data is being viewed in a first direction, and then providing cartoon data of a second story.

The invention claimed is:

1. A cartoon data display device for displaying cartoon data having a plurality of cuts, each including a plurality of layers, the display device comprising:

a display unit configured to display a display region of the cartoon data;

a user interface configured to receive a first user event signal input from a user for moving the display region of the cartoon data displayed on the display unit in a first direction or a second user event signal input from the user for moving the display region of the cartoon data displayed on the display unit in a second direction opposite the first direction;

a control processor configured to perform control to display only a first layer of the plurality of layers of a select cut from the plurality of cuts of the cartoon data displayed on the display unit while moving the cartoon data in the first direction in response to the reception of the first user event signal, and display a second layer of the plurality of layers of the select cut from the plurality of cuts of the cartoon data displayed on the display unit while moving the cartoon data in the second direction in response to the reception of the second user event signal without the reception of the first user event signal; and wherein the control processor performs control to display the second layer on the display unit while moving the second layer in the second direction in response to the reception of the second user event signal after at least a predetermined threshold number of cuts of the cartoon data is displayed on the display unit.

2. The cartoon data display device of claim 1, wherein the user interface receives one of a scroll input, a direction key input, and a moving touch input from the user.

3. The cartoon data display device of claim 1, wherein the second layer includes guidance information for inducing reading of the cartoon data on the display unit to be repeated at least once.

4. The cartoon data display device of claim 1, wherein the control processor performs control to overlay and display the second layer on the first layer when the second user event signal is received.

5. The cartoon data display device of claim 1, wherein the control processor performs control to end the display of the first layer on the display unit and display the second layer on the display unit when the second user event signal is received.

6. The cartoon data display device of claim 1, wherein the control processor performs control to display the second layer on the display unit while moving the second layer in the second direction in response to the reception of the second user event signal only after a last cut of the cartoon data is displayed on the display unit.

7. The cartoon data display device of claim 1, wherein the control processor performs control to display the second layer on the display unit in response to the reception of either the first user event signal or the second user event signal after a last cut of the cartoon data is displayed on the display unit.

8. A cartoon data display method for displaying cartoon data having a plurality of cuts, each including a plurality of layers, the display method comprising:

displaying, by a display unit, a display region of cartoon data;

receiving, by a user interface, a first user event signal input from a user for moving the display region of the cartoon data displayed on the display unit in a first direction or a second user event signal input from the user for moving the display region of the cartoon data displayed on the display unit in a second direction opposite the first direction;

performing, by a control processor, control to display only a first layer of the plurality of layers of a select cut from the plurality of cuts of the cartoon data displayed on the display unit while moving the cartoon data in the first direction in response to the reception of the first user event signal, and display a second layer of the plurality of layers of the select cut from the plurality of cuts of the cartoon data displayed on the display unit while moving the cartoon data in the second direction in response to the reception of the second user event signal without the reception of the first user event signal; and wherein the control processor performs control to display the second layer on the display unit while moving the second layer in the second direction in response to the reception of the second user event signal after at least a predetermined threshold number of cuts of the first layer is displayed on the display unit.

9. The cartoon data display method of claim 8, wherein the receiving of the first user event signal or the second user event signal comprises receiving one of a scroll input, a direction key input, and a moving touch input from the user.

10. The cartoon data display method of claim 8, wherein the second layer includes guidance information for inducing reading of the cartoon data on the display unit to be repeated at least once.

11. The cartoon data display method of claim 8, wherein the control processor performs control to overlay and display the second layer on the first layer when the second user event signal is received.

12. The cartoon data display method of claim 8, wherein the control processor performs control to end the display of the first layer and display the second layer when the second user event signal is received.

13. The cartoon data display method of claim 8, wherein the control processor performs control to display the second layer on the display unit while moving the second layer in the second direction in response to the reception of the second user event signal only after a last cut of the cartoon data is displayed on the display unit.

14. The cartoon data display method of claim 8, wherein the control processor performs control to display the second layer on the display unit in response to the reception of either the first user event signal or the second user event signal after a last cut of the cartoon data is displayed on the display unit.

15. A non-transitory computer readable recording medium storing a program for displaying cartoon data having a plurality of cuts, each including a plurality of layers, the program enabling a computer to execute the steps comprising:

displaying, on a display unit, a display region of the cartoon data;

receiving, through a user interface, a first user event signal input from a user for moving the display region of the cartoon data displayed on the display unit in a first direction or a second user event signal input from the user for moving the display region of the cartoon data displayed on the display unit in a second direction opposite the first direction;

performing control to display only a first layer of the plurality of layers of a select cut from the plurality of cuts of the cartoon data on the display unit while moving the cartoon data in the first direction in response to the reception of the first user event signal, and display a second layer of the plurality of layers of the select cut from the plurality of cuts of the cartoon data displayed on the display unit while moving the cartoon data in the second direction in response to the reception of the second user event signal without the reception of the first user event signal; and wherein the second layer is displayed on the display unit while moving the second layer in the second direction in response to the reception of the second user event signal after at least a predetermined threshold number of cuts of the cartoon data is displayed on the display unit.

* * * * *